Oct. 31, 1933.  F. F. BUSEKIST  1,933,093

SAW HANDLE

Filed May 12, 1931

Frederic F. Busekist INVENTOR.
BY Harry C. Schroeder
ATTORNEYS.

Patented Oct. 31, 1933

1,933,093

UNITED STATES PATENT OFFICE 1,933,093

SAW HANDLE

Frederic F. Busekist, Berkeley, Calif.

Application May 12, 1931. Serial No. 536,746

1 Claim. (Cl. 145—113)

This invention is a saw handle, and has reference to a detachable metal saw handle which is adapted to replace the usual wood saw handle.

The main object of the invention is to provide an unbreakable handle for saws, of similar contour to the usual wood handle.

Another object of the invention is to provide a handle which is light in weight and as readily attached or detached from the saw blade as the usual wood handle.

A further object of the invention is to provide a handle as outlined which is formed with two cooperating parts, which when clamped together provide a handle with smooth surface due to aligning and interlocking means cooperating between the two parts.

Other objects of the invention will become apparent as the following description is read on the drawing forming a part of this specification and in which similar reference characters are used to indicate similar parts throughout the several views, and in which.

Figure 2:
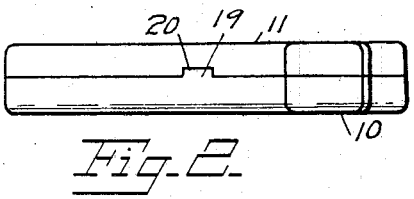
Fig. 2 is a top plan view of the invention.
Figure 4:
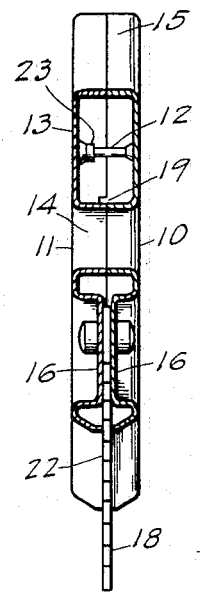
Fig. 4 is a section taken on line 4—4 of Fig. 1.
Figure 1:
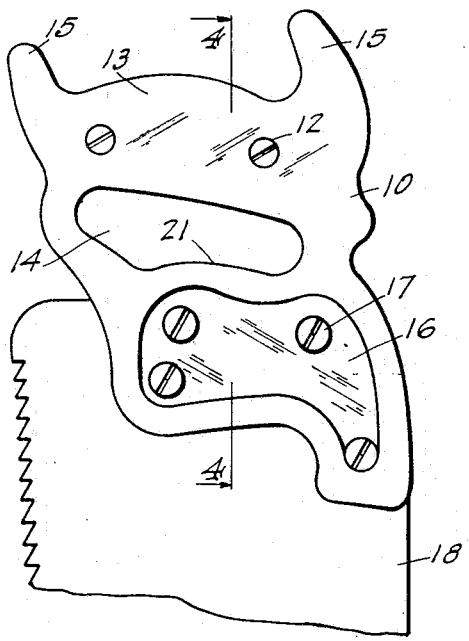
Fig. 1 is a side elevation of the invention.
Figure 3:
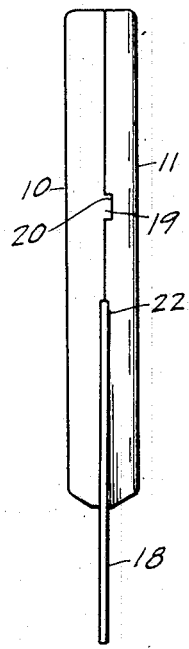
Fig. 3 is a back view.

The invention is formed in two cooperating parts 10 and 11, which when secured together by means of screws 12 form a complete handle.

Each part is pressed from sheet metal and formed with a grip 13, finger slot 14, horns 15 and an inset saw clamp portion 16. Holes are provided to receive the attaching screws 17 to suit the holes in the saw blade 18. Keys 19 and cooperating keyways 20 are formed in the top, front and back and preferably one in the surface 21 forming the lower periphery of the finger slot 14. A slot 22 is formed between the members 10 and 11 to receive and clamp the saw blade 18 and the inset portion 16 has the inside surface set back in alignment with the slot 22.

Screws 12 are secured either by tapping one of the handle parts, or countersinking both parts and providing countersunk nuts 23.

The two parts 10 and 11 are first assembled and secured by means of screws 12, the saw blade 18 is inserted in the slot 22, and fixedly secured by means of bolts 17 which clamp the periphery of the saw receiving portion and then clamp the inset portions 16 against the saw blade 18, thus, the saw blade is securely fixed in the handle.

It will be noted that a rigid, unbreakable, positively aligned handle is thus provided, and it will be understood that variations in construction and arrangement of parts which are consistent with the appended claim may be resorted to without detracting from the spirit or scope of the invention or sacrificing any of the advantages thereof.

I claim:—

A saw handle formed of two complementary saw handle halves, each consisting of a grip portion and a saw blade clamp portion, the two halves being provided with aligning means, the saw blade clamp portion of each half having peripheral walls, and an outer surface in a plane with the plane of the handle portion and an inset portion spaced from the peripheral walls whereby clamping action of the peripheral walls and the inset portion are both provided against the saw blade, the walls of the inset portion being perpendicular to the plane of the saw blade, the peripheral walls being perpendicular to the saw blade throughout a portion of their height, thence extending diagonally and continuing by a return bend into the walls of the inset portion, the halves being formed of sheet metal to permit independent clamping action of the periphery of the saw blade clamp portion and the inset portion, and a plurality of spaced apart screws cooperating between the inset portions, the resiliency of the sheet metal permitting each screw to act independently to clamp the inset portions against the saw blade and coincidentaly clamp the peripheral walls against the saw blade whereby the saw blade is rigidly secured in the handle.

FREDERIC F. BUSEKIST.